United States Patent
Da Palma et al.

(10) Patent No.: US 8,041,573 B2
(45) Date of Patent: *Oct. 18, 2011

(54) INTEGRATING A VOICE BROWSER INTO A WEB 2.0 ENVIRONMENT

(75) Inventors: William V. Da Palma, Coconut Creek, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

This patent is subject to a terminal disclaimer.

(21) Appl. No.: 11/766,157

(22) Filed: Jun. 21, 2007

(65) Prior Publication Data

US 2008/0319759 A1 Dec. 25, 2008

Related U.S. Application Data

(63) Continuation-in-part of application No. 11/765,900, filed on Jun. 20, 2007, and a continuation-in-part of application No. 11/765,928, filed on Jun. 20, 2007, and a continuation-in-part of application No. 11/765,962, filed on Jun. 20, 2007.

(51) Int. Cl.
*G10L 21/00* (2006.01)
(52) U.S. Cl. ............... 704/270; 704/270.1; 704/275
(58) Field of Classification Search .............. 704/7, 9, 704/270, 270.1, 200, 3, 258, 278, 275, 277, 704/276; 707/102; 709/246
See application file for complete search history.

(56) References Cited

U.S. PATENT DOCUMENTS

| 6,314,402 B1 | 11/2001 | Monaco et al. |
| 6,324,511 B1 | 11/2001 | Kiraly et al. |
| 6,442,577 B1 | 8/2002 | Britton et al. |
| 6,636,831 B1 | 10/2003 | Profit, Jr. et al. |
| 6,801,604 B2 | 10/2004 | Maes et al. |

(Continued)

FOREIGN PATENT DOCUMENTS

WO 200511921 12/2005

OTHER PUBLICATIONS

Huang, C.M., et al., "Phone-Web: Accessing WWW using a telephone set", World Wide Web, vol. 2, No. 3, pp. 161-178, 1999.

(Continued)

*Primary Examiner* — Huyen X. Vo
(74) *Attorney, Agent, or Firm* — Patents on Demand, P.A.; Brian K. Buchheit; Scott M. Garrett

(57) ABSTRACT

The present invention discloses a system and method for integrating a voice browser into a Web 2.0 environment. For example, a system is disclosed which includes at least a Web 2.0 server, a voice browser, and a server-side speech processing system. The Web 2.0 server can serve Web 2.0 content comprising at least one speech-enabled application. The served Web 2.0 content can include voice markup. The voice browser can render the Web 2.0 content received from the Web 2.0 server which includes rendering the voice markup. The server-side speech processing system can handle speech processing operations for the speech-enabled application. Communications with the server-side speech processing system occur via a set of RESTful commands, such as an HTTP GET command, an HTTP POST command, an HTTP PUT command, and an HTTP DELETE command.

20 Claims, 4 Drawing Sheets

U.S. PATENT DOCUMENTS

| | | | |
|---|---|---|---|
| 6,865,599 | B2 | 3/2005 | Zhang |
| 7,143,148 | B1 | 11/2006 | Hickman et al. |
| 7,334,050 | B2 * | 2/2008 | Zondervan et al. ........... 709/246 |
| 7,581,166 | B2 | 8/2009 | Renger et al. |
| 7,631,104 | B2 | 12/2009 | Da Palma et al. |
| 7,673,017 | B2 | 3/2010 | Kim et al. |
| 2002/0010756 | A1 | 1/2002 | Oku |
| 2002/0052747 | A1 | 5/2002 | Sarukkai |
| 2003/0055884 | A1 | 3/2003 | Yuen et al. |
| 2003/0088421 | A1 | 5/2003 | Maes et al. |
| 2003/0139928 | A1 | 7/2003 | Krupatkin et al. |
| 2003/0177010 | A1 | 9/2003 | Locke |
| 2005/0132056 | A1 | 6/2005 | Creamer et al. |
| 2006/0004700 | A1 | 1/2006 | Hofmann et al. |
| 2006/0015335 | A1 | 1/2006 | Vennelakanti et al. |
| 2006/0195328 | A1 | 8/2006 | Abraham et al. |
| 2007/0078884 | A1 * | 4/2007 | Ott et al. ........................ 707/102 |
| 2008/0086689 | A1 | 4/2008 | Berkley et al. |
| 2008/0242221 | A1 | 10/2008 | Shapiro et al. |
| 2008/0319742 | A1 | 12/2008 | Da Palma et al. |
| 2008/0319757 | A1 | 12/2008 | Da Palma et al. |
| 2008/0319758 | A1 | 12/2008 | Da Palma et al. |
| 2008/0319760 | A1 | 12/2008 | Da Palma et al. |
| 2008/0319761 | A1 | 12/2008 | Da Palma et al. |
| 2008/0319762 | A1 | 12/2008 | Da Palma et al. |
| 2008/0320079 | A1 | 12/2008 | Da Palma et al. |
| 2008/0320443 | A1 | 12/2008 | Da Palma et al. |

OTHER PUBLICATIONS

Freier, J., et al., "WebViews: Accessing Personalized Web Content and Services", Proc. Of 10th Int'l Conf. on WWW, Hong Kong, pp. 576-586, 2001.

Goose, S., et al., "Streaming speech3: a framework for generating and streaming 3D text-to-speech and audio presentations to wireless PDAs as specified using extensions to SMIL", Proc. Of 11th Int'l. Conf. On WWW, Honolulu, HI, pp. 37-44, 2002.

Jieun, P., et al., "Conversational browser for accessing VoiceXML-based IVR services via multi-modal interactions on mobile devices", WSEAS Trans. on Computers, vol. 3, No. 1, pp. 85-91, Jan. 2004.

Capra III, R.G., et al., "Mobile refinding of web information using a voice interface: an exploratory study", Proc. of 2005 Latin American Conf. On Human-computer interaction, Cuernavaca, Mexico, pp. 88-99, 2005.

Chang, S.E., et al., "The implementation of a secure and pervasive multimodal Web system architecture", Inf. And Software Tech., vol. 48, No. 6, pp. 424-432, Jun. 2006.

"BLIKI", [online] Wikipedia [retrieved Feb. 23, 2007] retrieved from the Internet: <http://en.wikipedia.org/wikilBliki>.

"Cyn.In," [online] Cynapse [retrieved Feb. 23, 2007] retrieved from the Internet: <http:llwww.cynapse.com/cynin>.

DeMaria, M.J., "Searching For the Right Words", Network Computing, vol. 17, No. 22, pp. 26, 28, Oct. 26, 2006.

"Enterprise Bliki," [online] Wikipedia, [retrieved Feb. 23, 2007] retrieved from the Internet: http://en.wikipedia.org/wiki/Enterprise_bliki>.

Fielding, R., et al., "Principled Design of the Modern Web Architecture," ACM Trans. On Internet Technology, vol. 2, No. 2, May 2002, pp. 115-150.

Kolias, et al., "A Pervasive Wiki Application Based on VoiceXML," ACM, PETRA '08, Jul. 15-19, 2008.

Leseney, T., "Push-to-blog", Siemens AG, Oct. 2004.

Nottingham, M., et al., "Request for Comments (RFC) 4287: The Atom Syndication Format," The Internet Society, Dec. 2005, 43 pages.

Schaffert, et al., "IkeWiki: A Semantic Wiki for Collaborative Knowledge Management,"IEEE Int'l. Workshops on Enabling Technologies: Infrastructure for Collaborative Enterprises, 2006.

"SuiteTwo: Features", [online] Moveable Type, 2006 [retrieved Feb. 23, 2007] retrieved from the Internet: < http://suitetwo.com/features>.

Takami, et al., "A Study on the Architecture and Voice Dialog Scheme for a Personal Web Service in a Ubiquitous Communication Environment," IEEE, pp. 398-401, Jun. 2006.

"Wiki," [online] Wikipedia [retrieved Feb. 23, 2007] retrieved from the Internet: <http://en.wikipedia.org/wiki/Wiki>.

US Patent No. 7631104, Notice of Allowance, Jul. 29, 2009.

Fielding, R., et al., "Hypertext Transfer Protocol—HTTP/1.1," [online] Internet RFC 2616, The Internet Society, 1999, [retrieved Jul. 22, 2009] retrieved from the Internet: <http://www.w3.org/Protocols/rfc2616/rfc2616.html>.

O'Reilly, T., "What is Web 2.0," [online] O'Reilly Network, Sep. 30, 2005, [retrieved Nov. 25, 2008] retrieved from the Internet <http://www.oreillynet.com/pub/a/oreilly/tim/news/2005/09/30/what-is-web-20.html>.

* cited by examiner

INTEGRATING A VOICE BROWSER INTO A WEB 2.0 ENVIRONMENT

CROSS-REFERENCE TO RELATED APPLICATIONS

This continuation-in-part application claims the benefit of U.S. patent application Ser. No. 11/765,900 filed Jun. 20, 2007, the benefit of U.S. patent application Ser. No. 11/765,928 filed Jun. 20, 2007, and the benefit of U.S. patent application Ser. No. 11/765,962 filed Jun. 20, 2007, which are incorporated by reference herein.

BACKGROUND

1. Field of the Invention

The present invention relates to the field of speech processing and Web 2.0 technologies and, more particularly, to integrating a voice browser in a Web 2.0 environment.

2. Description of the Related Art

Voice response systems utilize a voice user interface to interact with users, such as interacting via a telephone. Many of these voice response systems include a voice browser or voice interpreter which processes voice markup, such as VoiceXML. The voice markup specifies speech processing actions which are to be performed by speech processing engines. The engines are often turn-based engines integrated into a networked speech processing system. For example, middleware solutions, such as IBM's WEBSPHERE, often include speech processing resources and a linked voice browser which provide speech processing capabilities to one or more voice response systems. Use of speech processing capabilities has traditionally required creation of specialized software routines that use a voice toolkit to interact with a networked speech processing system. Coding this specialized software requires programming skills beyond the expertise level of many software developers and most end users.

The complexity of creating interfaces to networked speech processing systems has prevented speech capabilities from entering many important software market segments. One of the more important segments that currently is devoid of speech processing capabilities is the Web 2.0 market. Web 2.0 refers to a set of Web applications/sites that promote collaboration and information sharing among large groups of users. A fundamental Web 2.0 principle is to grant end-users an ability to read, write, and update existing Web 2.0 content, actions traditionally restricted to software developers. Additionally, Web 2.0 applications often depend upon the collaborative effort of end-users to provide new content and revise existing content. Different types of Web 2.0 applications include WIKIs, BLOGs, FOLKSONIMIES, social networking sites, and the like.

What is needed is a solution through which voice browsers can be integrated into a Web 2.0 environment, such that Web 2.0 content providers (e.g., end-users) will be able to create and modify speech-enabled content. This would permit Web 2.0 content to be accessible from non-traditional clients, such as a telephone. An ideal solution would also permit Web 2.0 content providers and/or users to customize speech-processing behavior of speech-enabled Web 2.0 applications. For example, a Web 2.0 user or content provider would preferably be able to customize characteristics of a speech synthesis voice and/or a speech recognition system integrated with the Web 2.0 environment. Conventional voice browser implementations typically reside in proprietary systems that are not accessible or modifiable by end users.

SUMMARY OF THE INVENTION

The present invention discloses a solution for integrating a voice browser into a Web 2.0 environment. The voice browser can receive voice markup and other Web 2.0 content from the Web 2.0 server, which it utilizes to interact with clients having voice interfaces. The served Web 2.0 content can include speech-enabled applications formatted in a REST/ATOM (Representational State Transfer/Atom Publishing Protocol or APP) format. Each of these applications can be introspected and modified. Introspection and modification applies to "live" or running speech-enabled applications, such as VoiceXML, and to resources used by the speech-enabled applications.

Additionally, JAVA SCRIPT code, such as AJAX, can be specified within the Web 2.0 content and used to interface with speech engines for visual and voice browsers. The JAVA SCRIPT interface can provide consistency between visual and voice browsers. Use of JAVA SCRIPT interfaces for voice can also greatly reduce a complexity of the voice browser which conventionally requires the creation of a voice client interface layer to integrate the browser with speech processing resources. In one embodiment, JAVA SCRIPT code can also be used to access non-speech data, such as data of a back-end system or database, using asynchronous HTTP requests. Appreciably, conventional voice browsers typically use the VoiceXML<data> or <subdialog> tags for requests, which are synchronous in nature.

The present invention can be implemented in accordance with numerous aspects consistent with the material presented herein. For example, one aspect of the present invention can include a system for using Web 2.0 as an interface to speech engines. The system can include at least a Web 2.0 server, a voice browser, and a server-side speech processing system. The Web 2.0 server can serve Web 2.0 content comprising at least one speech-enabled application. The served Web 2.0 content can include voice markup. The voice browser can render the Web 2.0 content received from the Web 2.0 server which includes rendering the voice markup. The server-side speech processing system can handle speech processing operations for the speech-enabled application. Communications with the server-side speech processing system occur via a set of RESTful commands, such as a Hyper Text Transport Protocol (HTTP) GET command, an HTTP POST command, an HTTP PUT command, and an HTTP DELETE command.

Another aspect of the present invention can include a voice browser configured to render speech-enabled applications served by a Web 2.0 server. Each speech-enabled application rendered by the voice browser can include an introspection document, a collection of entries, and a collection of resources. At least one of the resources can be a speech resource associated with a speech engine which adds a speech processing capability to the speech-enabled application.

Still another aspect of the present invention can include a method for speech-enabling Web 2.0 content. In the method, Web 2.0 content can be received from a Web 2.0 server. The Web 2.0 content can contain voice markup and JAVA SCRIPT code, such as AJAX. Further, the Web 2.0 content can be part of a speech-enabled application which conforms to an APP based protocol. The JAVA SCRIPT code can be executed by the voice browser to establish an interface between a voice browser and at least one remotely located speech processing engine. The executing JAVA SCRIPT can establish at least one audio linkage over which speech input/output can be conveyed. Digitally encoded messages related to speech audio can also be exchanged between the speech processing engine and the voice browser. These messages can include speech processing result data which the voice browser consumes to perform operations based upon the results.

In one embodiment, the audio linkage established by the JAVA SCRIPT can be established by hooking a speech processing engine's audio universal resource identifier (URI) with an audio URI of a Voice Over Internet Protocol (VoIP) endpoint or the voice browser, which is connected to a caller so that audio can be exchanged directly between those endpoints. In another embodiment, the audio linkage can be an actual audio channel, through which audio data itself can be conveyed.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
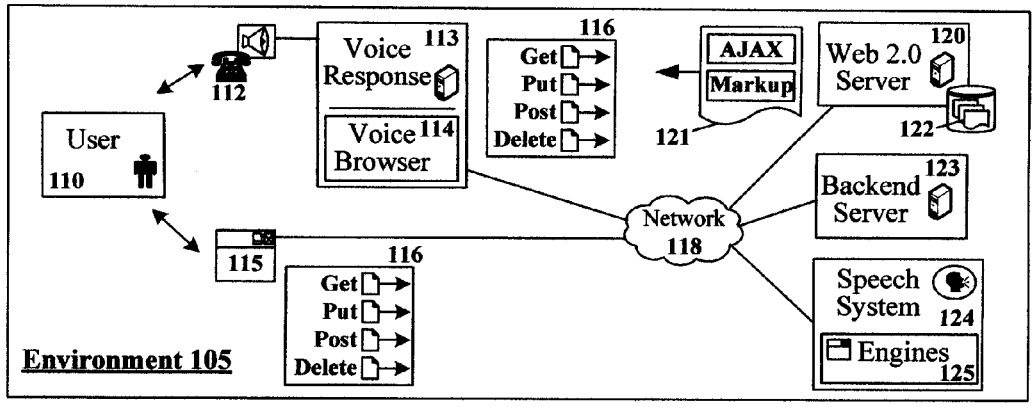
FIG. 1 is a flow diagram illustrating a voice browser integrated into a speech-enabled Web 2.0 environment in accordance with an embodiment of the inventive arrangements disclosed herein.
Figure 1:
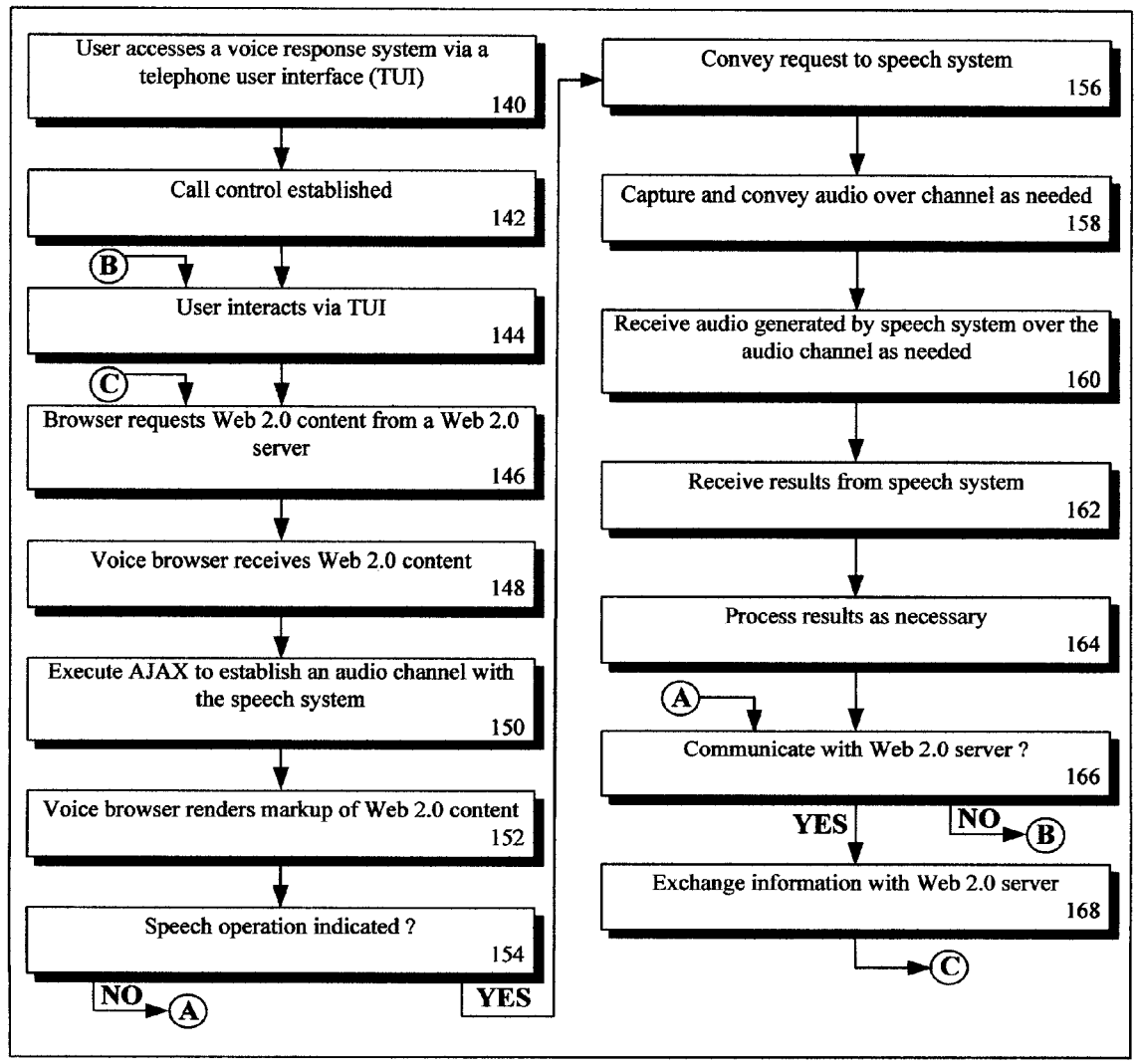

FIG. 1 is a flow diagram illustrating a voice browser 114 integrated into a speech-enabled Web 2.0 environment 105 in accordance with an embodiment of the inventive arrangements disclosed herein. In illustrated environment 105, an end-user 110 can use a voice only interface 112 to interact with a voice response system 113. The voice response system 113 interfaces with a Web 2.0 server 120 over a network 118. The Web 2.0 server 120 can serve Web content 121 of speech-enabled applications 122. Speech processing operations for the applications 122 can be performed by speech engines 125 of a speech system 124. Further, the Web 2.0 server 120 can serve backend content from server 123 to the user 110 and can provide user responses to the back-end server 123 as appropriate. In one embodiment, user 110 can alternatively use a Web browser 115 to interact with the Web 2.0 server 120. Common interface mechanisms can be used by both voice browser 114 and Web browser 115.

For example, either browser 114-115 can communicate using a set of RESTful commands 116. The RESTful commands 116 can include GET, PUT, POST, and/or DELETE commands, which can be Hyper Text Transport Protocol (HTTP) based commands. There are no assumptions regarding the client upon which the interface 112 or browser 115 executes other than an ability to communicate with a Web 2.0 server 120 via network 118.

In another example, AJAX (or other JAVA SCRIPT) code contained in Web 2.0 content 121 can be used to interface with a set of remotely located speech resources (e.g., engines 125). In one configuration, the voice browser 114 can use AJAX initialization routes which execute when the speech-enabled application 122 starts. The initialization routine can establish an audio linkage between the browser 114-115 and the speech system 124 in a scenario involving a legacy (e.g., non-VoIP) voice response system, or with a Voice Over Internet Protocol (VoIP) endpoint in a scenario involving a voice response system in a VoIP environment (not shown). The linkage can be established by an exchange audio URI's between the speech processing system 124 and the browser 114-115 of VoIP gateway/device (not shown). That is, one audio URI can correspond to an audio endpoint of the speech processing system 124 and another audio URI can be an audio endpoint of the browser 114-115 or VoIP gateway/device (not shown), which sends/receives audio to/from the user 110. The audio linkage can also represent an audio channel through which audio data itself can be conveyed. In one embodiment, real-time audio can be conveyed across the audio linkage, if desired, using any of a variety of communication protocols, such as Real Time Protocol (RTP) which can be specified by the introspection associated with speech-enabled application 122.

The browsers 114-115 can include a set of AJAX libraries to interface with server 124 resources over HTTP. Use of AJAX permits consistency between the visual 115 and voice 114 browsers, reduces code complexity needed for speech processing tasks, and permits asynchronous requests.

Each application 122 can be associated with an introspection document and a collection of entries and resources. The resources can link a Web 2.0 server 120 to speech processing engines 125 of speech system 124. End-users 110 of environment 105 can be permitted to introspect, customize, add, re-order, and remove entries and resources of the collections via the browsers 114-115. In one embodiment, applications and resources can also be created/modified by a graphical editor (not shown) of the Web 2.0 server 120. In one embodiment, the application 115 can be written in accordance with Representational State Transfer architecture (REST) principles. For example, the application 122 can conform to the ATOM PUBLISHING PROTOCOL (APP).

The voice response system 113 can be an automated system that permits users 110 to interact with applications 122 through a voice communication channel. The voice response system 113 can incorporate telephone technologies to permit callers 110 to receive speech output and to present speech and/or Dual Tone Multi-Frequency (DTMF) dial pad input. The voice response system 113 can provide dialog prompts, each associated with a constrained grammar or a set of acceptable responses. These responses can, in turn, be mapped to programmatic actions which are selectively triggered based upon user responses to the prompts. In one embodiment, the applications 122 can be written in VoiceXML or other voice markup language, which is interpreted or rendered by a VoiceXML browser 114 included within or accessed by the voice response system 113.

The Web 2.0 server 120 can be a WIKI server, a BLOG server, MASHUP server, a FOLKSONOMY server, a social networking server, and the like. A speech system 124 can include speech processing engines 125 which can be accessed by the server 120 or browser 114-115 through use of a set of RESTful commands 116. Further, the speech system 124 can be part of a turn-based network system, such as the WEB-SPHERE VOICE SERVER.

The method of FIG. 1, which includes steps 140-168, can be performed in the context of environment 105. The method can begin in step 140, where a user accesses a voice response system via a telephone user interface (TUI) or other voice user interface. In step 142, call control operations can execute, which establishes a telephony link between the user 110 and the voice response system 113. In step 144, the user 110 can interact with the TUI. In step 146, the browser 114 can request Web 2.0 content 121 from a Web 2.0 server 120.

The voice browser 114 can receive the Web 2.0 content 121 in step 148. In step 150, AJAX code can be executed to establish an audio linkage or channel with the speech system 124. In one embodiment, this audio "channel" can refer to an audio file referenced by an HTTP URI. In step 152, the voice browser 114 can render markup of the Web 2.0 content 121. In step 154, the method can determine whether a speech operation has been initiated. If not, the method can skip from step 154 to step 166.

If a speech operation is indicated, the method can proceed from step 154 to step 156, where a speech processing request can be conveyed to the speech system 124. In step 158, when speech is to be provided to the speech system 124 (i.e., the speech processing request is for a speech-to-text (STT) operation or a speaker identity verification (SIV) operation), user provided audio can be captured and conveyed over the established audio linkage. In step 160, when audio is to be received (e.g., the speech processing request is for a text-to-speech (TTS) operation), system 124 generated audio can be conveyed over the established audio linkage. In step 162, results from the speech system 124 can be received, such as through a digitally encoded message conveyed via a HTTP communication. In step 164, the voice browser 114 can process speech system 124 results as necessary.

In step 166, a determination can be made as to whether the voice browser 114 is to communicate with the Web 2.0 server. If so, the information can be exchanged in step 168, which can cause new Web 2.0 content 121 to be sent to the browser 114, as shown by looping from step 168 to step 146. When the potential speech processing operation does not result in a communication with the Web 2.0 server 120, the method can loop from step 166 to step 144, where the user can continue to interact via the TUI.

Figure 2:
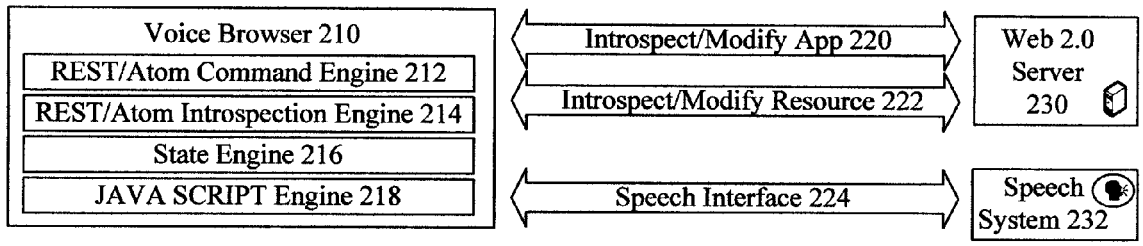
FIG. 2 is a schematic diagram of a voice browser able to be integrated into a Web 2.0 environment in accordance with an embodiment of the inventive arrangements disclosed herein.

FIG. 2 is a schematic diagram of a voice browser 210 able to be integrated into a Web 2.0 environment in accordance with an embodiment of the inventive arrangements disclosed herein. In one embodiment, the voice browser 210 can be the voice browser 114 of FIG. 1.

The voice browser 210 can be a browser capable of rendering voice markup, such as VoiceXML, X+V, and the like. The voice browser 210 can include a REST/ATOM command engine 212, a REST/ATOM introspection engine 214, a state engine 216, and a JAVA Script engine 218.

The REST/ATOM command engine 212 permits the voice browser 210 to accept and issue RESTful commands, which include a HTTP GET command, a HTTP POST command, a HTTP PUT command, and a HTTP DELETE command. These commands have different meanings depending upon their context of use. One context of use applies to a "live" application, where the RESTful commands acquire, add, remove, and update application content. In another context, the RESTful commands acquire, add, remove, and update resources used by an application. Resources can include speech processing resources.

The HTTP GET command can return capabilities and elements that are modifiable in the browser 210. For "live" applications, the HTTP GET command can be used to return all state information, such as fields in a form, which can be changed by a user.

The HTTP POST command can be used to trigger an interpretation of a voice browser 210 application. The HTTP POST command is not a valid browser command for "live" application purposes.

The HTTP PUT command can be used to update configuration items (resources) in a voice browser 210. For a "live" application, the HTTP PUT command can change a state of a field in the application.

The HTTP DELETE command can remove a resource from a voice browser 210. The HTTP DELETE command can also remove a state entry, such as content contained in a field of an application.

The introspection engine 214 provides introspection support for speech-enabled applications formatted in accordance with the APP protocol or other RESTful protocol, which supports introspection. The introspection engine 214 can provide introspection with dynamic discovery and asynchronous configuration of speech resources, which are resources of the speech system 232. Additionally, the introspection engine 214 can introspect an APP application to allow state changes for a speech-enabled application. That is, the introspection engine 214 can introspect a collection of entries and resources, which form a speech-enabled application configured for a Web 2.0 for speech environment.

The state engine 216 can utilize engines 212 and 214 to manage state for a speech-enabled application. State of a "live" application can be queried and modified. In one embodiment, the state engine 216 can synchronize multiple concurrent modalities for a single application instance. For example, the state engine 216 can detect when a field update occurs via a GUI modality, and automatically apply the state change information to a voice-only modality of the same application. Further, the sate engine 216 can save a current state, either automatically or through explicit user selection, so that field values from a previous user session are available in future sessions with that user. This state information can be stored by engine 216 regardless of which interactive modality is currently being used and regardless of whether a previous modality is the same as a current modality.

It should be appreciated that the engines 212-216 applied to a "live" application, such as a VoiceXML application, permit a user to affect core operations for processing the application, such as a Form Interpretation Algorithm (FIA). This permits synchronization with visual updates on a visual channel, jumping speech dialog entries for previously filled fields, and the like.

As shown, the voice browser 210 can introspect/modify 220 a "live" application by sending suitable RESTful commands to a Web 2.0 server 230. The voice browser 210 can also introspect/modify resources 222 by sending suitable RESTful commands to the Web 2.0 server 230.

The JAVA SCRIPT engine 218 can define a speech interface 224 with a remotely located speech system 232. The speech interface 224 can be defined for a particular protocol in accordance with resources defined by the Web 2.0 server 230 for a speech-enabled application. The JAVA SCRIPT engine 218 can establish audio linkages or channels between the browser 210 and the speech system 232, which can include real-time audio channels. For example, AJAX code conveyed from the Web 2.0 server 230 can be executed by engine 218.

To illustrate, a speech recognition request can be represented by a JAVA SCRIPT (e.g., AJAX) function called 'recognize' in a Web 2.0 widget called 'VoiceASR'. The job of this function can be to provide audio input and to get text output from a speech engine which is part of the speech system 232. The JAVA SCRIPT function can also indicate in VoiceXML terms the results of the ASR task. The linkage of audio input can be performed by AJAX initialization routines that are executed when the speech-enabled application starts. If an audio URL is pre-existing, it can be sent to the speech system 232 and a new audio channel need not be established.

Figure 3:
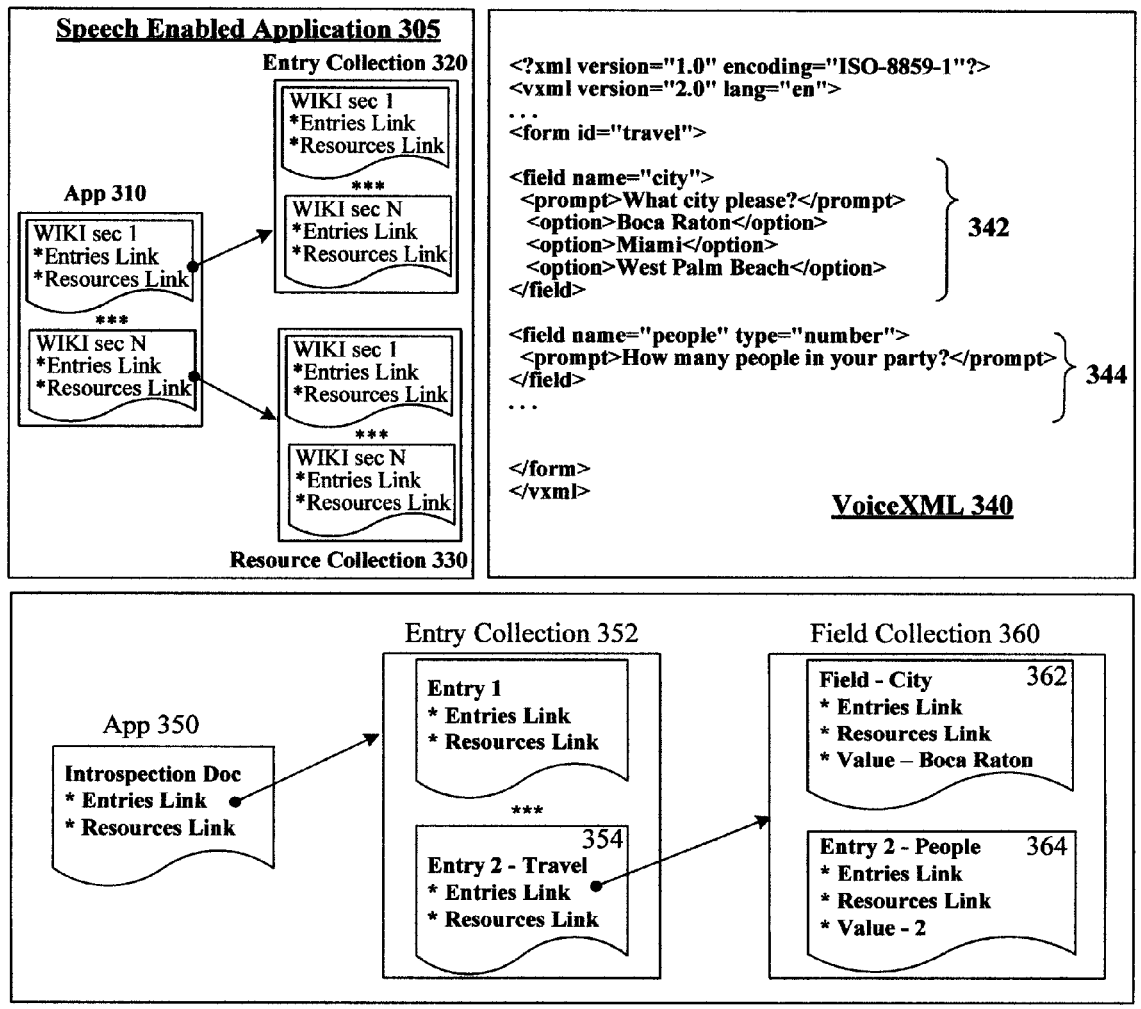
FIG. 3 is a schematic diagram illustrating a speech-enabled application in APP format, which a voice browser integrated into a Web 2.0 environment can execute.

FIG. 3 is a schematic diagram illustrating a speech-enabled application 305 in APP format which the voice browser integrated into a Web 2.0 environment can execute. The speech-enabled application 305 can be associated with an introspection document, and a collection of entries 320 and resources 330. End users can be permitted to introspect, customize, add, re-order, and remove entries and resources of the collections of the application 305 via a user-facing interface, which can be a standard voice browser and/or Web browser.

An initial entry collection 320 can refer to various pages of a Web 2.0 site 310, such as pages of a WIKI site. Each page can have an associated entry. Additionally, each page can link to other collections. When the collection 320 is a collection of entries, further decomposition of the corresponding Web 2.0 page can be specified. For example, the collection 320 can specify one or more sections of a Web 2.0 page. Additionally, each entry of collection 320 (or any other collection) can specify entity specific resources. These resources can be activated when the corresponding entity is active. When lower-level entries are active, all "parent" entries and their resources can also be active.

The resource collection 330 can include an entries link, used to configure the associated resource and can include links to other resources. Resources can include any of a variety of computing resources including, but not limited to, speech processing resources, media delivery resources, and the like. Speech processing resources can include automatic speech recognition resources (ASR), text-to-speech resources, speaker identification and verification (SIV) resources, voice interpreter resources, and the like. Media delivery resources can include Real Time Protocol (RTP), Real Time Streaming Protocol (RTSP), Media Resource Control Protocol (MRCP) resources, and the like.

Markup 340 represents sample markup, which can be conveyed from a Web 2.0 server to a voice browser. The markup 340 can be VoiceXML markup which prompts for a city field 342 having acceptable values of Boca Raton, Miami, and West Palm Beach. The markup 340 can also include a people field 344 designating a number of people who are to travel in accordance with the VoiceXML form associated with markup 340.

Application 350 depicts a state of an APP formatted application for the markup 340. Application 350 can be linked to an entry collection 352, which is further linked to child entries 360. Specifically, a travel entry 354 can be linked to a field for city 362 and a field for people 364. In the state shown for application 350, a value of Boca Ration can be placed in the city 362 field and a value of "2" can be placed in the people field 364. It should be appreciated that a voice browser can utilize RESTful commands (e.g., HTTP GET, HTTP POST, HTTP PUT, and/or HTTP DELETE) to determine and change a state of a "live" application. For example, values for the fields 362, 364 can be obtained, changed, and deleted using the RESTful commands.

Figure 4:
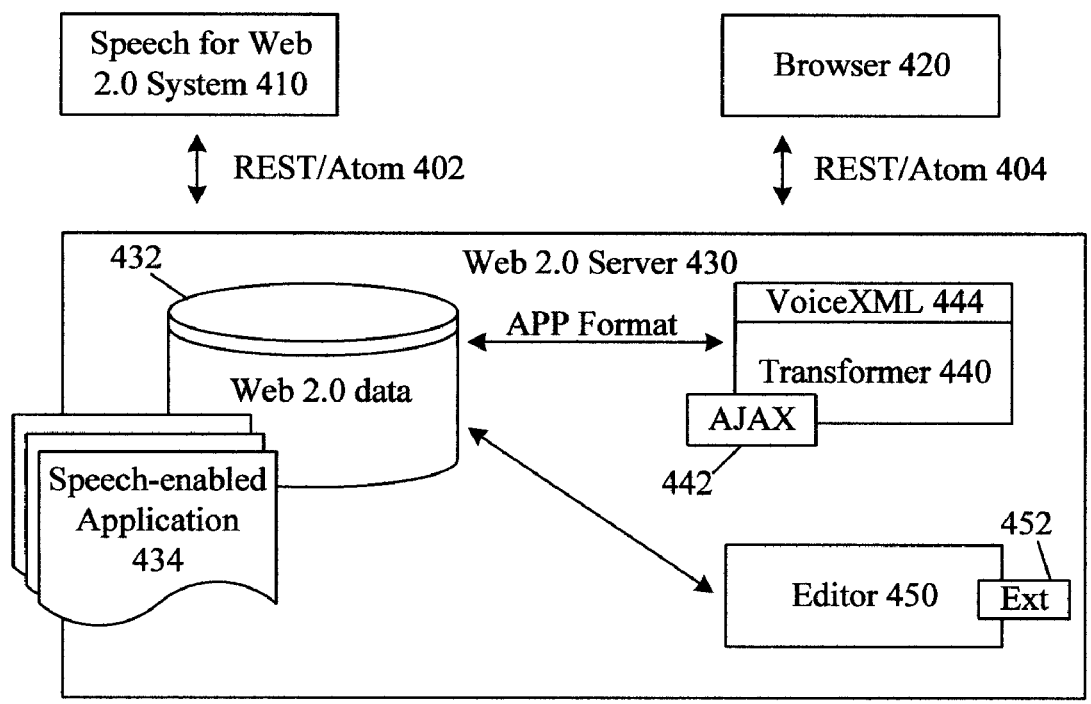
FIG. 4 is a schematic diagram illustrating a specific embodiment of a Web 2.0 server that serves speech-enabled applications to a voice browser in accordance with an embodiment of the inventive arrangements disclosed herein.

FIG. 4 is a schematic diagram 400 illustrating a specific embodiment of a Web 2.0 server that serves speech-enabled application to voice browser 420 in accordance with an embodiment of the inventive arrangements disclosed herein.

In system 400, a browser 420 can communicate with Web 2.0 server 430 via Representational State Transfer (REST) architecture/ATOM 404 based protocol. The Web 2.0 server 430 can communicate with a speech for Web 2.0 system 410 via a REST/ATOM 402 based protocol. Protocols 402, 404 can include HTTP and similar protocols that are RESTful by nature as well as an Atom Publishing Protocol (APP) or other protocol that is specifically designed to conform to REST principles.

The Web 2.0 server 430 can include a data store 432 in which applications 434, which can be speech-enabled, are stored. In one embodiment, the applications 432 can be written in a WIKI or other Web 2.0 syntax and can be stored in an APP format.

The contents of the application 432 can be accessed and modified using editor 450. The editor 450 can be a standard WIKI or other Web 2.0 editor having a voice plug-in or extensions 452. In one implementation, user-specific modifications made to the speech-enabled application 434 via the editor 450 can be stored in customization data store as a customization profile and/or a state definition. The customization profile and state definition can contain customization settings that can override entries contained within the original application 432. Customizations can be related to a particular user or set of users.

The transformer 440 can convert WIKI or other Web 2.0 syntax into standard markup for browsers. In one embodiment, the transformer 440 can be an extension of a conventional transformer that supports HTML and XML. The extended transformer 440 can be enhanced to handle JAVA SCRIPT, such as AJAX. For example, resource links of application 432 can be converted into AJAX functions by the transformer 440 having an AJAX plug-in 442. The transformer 440 can also include a VoiceXML plug-in 444, which generates VoiceXML markup for voice-only clients.

Figure 5:
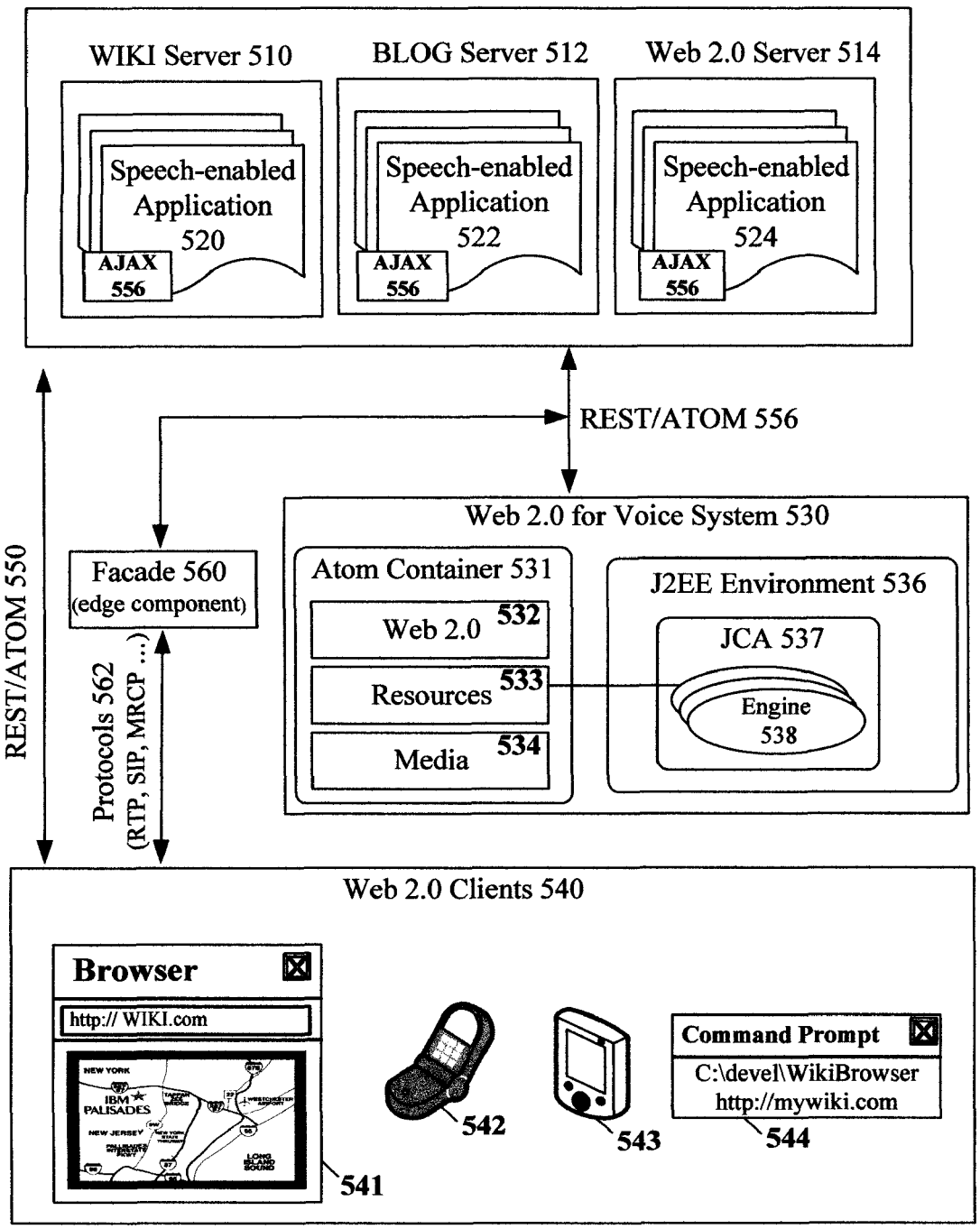
FIG. 5 is a schematic diagram of a system for a Web 2.0 for voice system in accordance with an embodiment of the inventive arrangements disclosed herein.

FIG. 5 is a schematic diagram of a system 500 for a Web 2.0 for voice system 530 in accordance with an embodiment of the inventive arrangements disclosed herein. System 500 can be an alternative representation and/or an embodiment for the system 100 of FIG. 1 or for a system that provides approximately equivalent functionality as system 100 utilizing Web 2.0 concepts to provide speech processing capabilities.

In system 500, Web 2.0 clients 540 can communicate with Web 2.0 servers 510-514 utilizing a REST/ATOM 550 protocol. The Web 2.0 servers 510-514 can serve one or more speech-enabled applications 520-524, where speech resources are provided by a Web 2.0 for Voice system 530. One or more of the applications 520-524 can include AJAX 556 or other JavaScript code. In one embodiment, the AJAX 556 code can be automatically converted from WIKI or other syntax by a transformer of a server 510-514.

Communications between the Web 2.0 servers 510-514 and system 530 can be in accordance with REST/ATOM 556 protocols. Each speech-enabled application 520-524 can be associated with an ATOM container 531, which specifies Web 2.0 items 532, resources 533, and media 534. One or more resource 533 can correspond to a speech engine 538.

The Web 2.0 clients 540 can be any client capable of interfacing with a Web 2.0 server 510-514. For example, the clients 540 can include a Web or voice browser 541 as well as any other type of interface 544, which executes upon a computing device. The computing device can include a mobile telephone 542, a mobile computer 543, a laptop, a media player, a desktop computer, a two-way radio, a line-based phone, and the like. Unlike conventional speech clients, the clients 540 need not have a speech-specific interface and instead only require a standard Web 2.0 interface. That is, there are no assumptions regarding the client 540 other than an ability to communicate with a Web 2.0 server 510-514 using Web 2.0 conventions.

The Web 2.0 servers 510-514 can be any server that provides Web 2.0 content to clients 540 and that provides speech processing capabilities through the Web 2.0 for voice system 530. The Web 2.0 servers can include a WIKI server 510, a BLOG server 512, a MASHUP server, a FOLKSONOMY server, a social networking server, and any other Web 2.0 server 514.

The Web 2.0 for voice system 530 can utilize Web 2.0 concepts to provide speech capabilities. A server-side interface is established between the voice system 530 and a set of Web 2.0 servers 510-514. Available speech resources can be introspected and discovered via introspection documents, which are one of the Web 2.0 items 532. Introspection can be in accordance with the APP specification or a similar protocol. The ability for dynamic configuration and installation is exposed to the servers 510-514 via the introspection document.

That is, access to Web 2.0 for voice system 530 can be through a Web 2.0 server that lets users (e.g., clients 540) provide their own customizations/personalizations. Appreciably, use of the APP 556 opens up the application interface to speech resources using Web 2.0, JAVA 2 ENTERPRISE EDITION (J2EE), WEBSPHERE APPLICATION SERVER (WAS), and other conventions, rather than being restricted to protocols, such as media resource control protocol (MRCP), real time streaming protocol (RTSP), or real time protocol (RTP).

The Web 2.0 for Voice system 530 is an extremely flexible solution that permits users (of clients 540) to customize numerous speech processing elements. Customizable speech processing elements can include speech resource availability, request characteristics, result characteristics, media characteristics, and the like. Speech resource availability can indicate whether a specific type of resource (e.g., ASR, TTS, SIV, Voice XML interpreter) is available. Request characteristics can refer to characteristics such as language, grammar, voice attributes, gender, rate of speech, and the like. The result characteristics can specify whether results are to be delivered synchronously or asynchronously. Result characteristics can alternatively indicate whether a listener for callback is to be supplied with results. Media characteristics can include input and output characteristics, which can vary from a URI reference to an RTP stream. The media characteristics can specify a codec (e.g., G711), a sample rate (e.g., 8 KHz to 22 KHz), and the like. In one configuration, the speech engines 538 can be provided from a J2EE environment 536, such as a WAS environment. This environment 536 can conform to a J2EE Connector Architecture (JCA) 537.

In one embodiment, a set of additional facades 560 can be utilized on top of Web 2.0 protocols to provide additional interface and protocol 562 options (e.g., MRCP, RTSP, RTP, Session Initiation Protocol (SIP), etc.) to the Web 2.0 for voice system 530. Use of facades 560 can enable legacy access/use of the Web 2.0 for voice system 530. The facades 560 can be designed to segment the protocol 562 from underlying details so that characteristics of the facade do not bleed through to speech implementation details. Functions, such as the WAS 6.1 channel framework or a JCA container, can be used to plug-in a protocol, which is not native to the J2EE environment 536. The media component 534 of the container 531 can be used to handle media storage, delivery, and format conversions as necessary. Facades 560 can be used for asynchronous or synchronous protocols 562.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for using Web 2.0 as an interface to speech engines comprising:
   a Web 2.0 server comprising hardware configured to serve Web 2.0 content comprising at least one speech-enabled application, wherein the served Web 2.0 content comprises voice markup;
   a voice browser executing within hardware configured to render the Web 2.0 content received from the Web 2.0 server, which includes rendering the voice markup; and
   a server-side speech processing system comprising hardware configured to handle speech processing operations for the at least one speech-enabled application, wherein communications with the server-side speech processing system occur via a set of RESTful commands, wherein each of the RESTful commands is a command in conformance with Representational State Transfer (REST) principles.

2. The system of claim 1, further comprising:
   an automated voice response system comprising hardware configured to interact with a voice only client, wherein interactions of the voice response system are programmatically controlled by machine readable instructions stored in a machine readable medium, wherein said machine readable instructions are part of the at least one speech-enabled application served by the Web 2.0 server and rendered by the voice browser.

3. The system of claim 1, further comprising:
at least one browser client comprising hardware configured to interact with the voice browser, wherein a user of the client is able to configure specific speech parameters, wherein the speech-enabled application executes in accordance with the specific speech parameters, and wherein the specific speech parameters specify at least one of speech resource availability, speech resource characteristics, and speech delivery characteristics.

4. The system of claim 1, wherein the speech-enabled application comprises an introspection document, a collection of entries, and a collection of resources each of which conforms to the Atom Publishing Protocol (APP) based protocol.

5. The system of claim 4, wherein speech resources of the speech-enabled application are dynamically discoverable through introspection, and wherein the voice browser is capable of configuring the speech resources of the speech-enabled application.

6. The system of claim 4, wherein use of introspection permits state of the speech-enabled application to be dynamically determined at runtime.

7. The system of claim 1, wherein the speech-enabled application comprises JAVA SCRIPT code, which the voice browser executes to establish an interface between a voice browser and the server side speech processing system, said interface including at least one audio linkage over which at least one of audio for speech input and audio for speech output is conveyed.

8. A voice browser stored in a tangible storage medium configured to render speech-enabled applications served by a Web 2.0 server, each of said speech-enabled applications comprising an introspection document, a collection of entries, and a collection of resources, wherein at least one of the resources is a speech resource associated with a speech engine which adds a speech processing capability to the speech-enabled application.

9. The voice browser of claim 8, wherein the speech engine is a speech engine of a remotely located server side speech processing system, said voice browser further comprising:
a JAVA SCRIPT execution engine configured to execute JAVA SCRIPT contained in the speech-enabled applications, wherein said JAVA SCRIPT establishes an interface between the voice browser and the server side speech processing system, said interface including at least one audio linkage over which at least one of audio for speech input and audio for speech output is conveyed.

10. The voice browser of claim 9, wherein the JAVA SCRIPT executed by the JAVA SCRIPT execution engine is written in AJAX, wherein said AJAX is also utilized by the voice browser to asynchronously handle non-speech data.

11. The voice browser of claim 8, further comprising:
a command engine configured to handle a set of RESTful commands which comprise a Hypertext Transfer Protocol (HTTP) GET command, an HTTP POST command, an HTTP PUT command, and an HTTP DELETE command wherein each of the RESTful commands is a command in conformance with Representational State Transfer (REST) principles;
an introspection engine configured to dynamically discover speech resources associated with the speech-enabled applications; and
a state engine configured to permit state of the speech-enabled applications to be dynamically determined at runtime using introspection.

12. A method for speech-enabling Web 2.0 content comprising:
receiving Web 2.0 content from a Web 2.0 server comprising hardware, wherein said Web 2.0 content contains voice markup and JAVA SCRIPT code;
executing the JAVA SCRIPT code to establish an interface between a voice browser executing in a client comprising hardware and at least one remotely located speech processing engine;
the executing JAVA SCRIPT establishing at least one audio linkage over which at least one of audio for speech input and audio for speech output is conveyed;
for audio conveyed between the established audio linkage, receiving a digitally encoded message comprising speech processing result data; and
the voice browser processing the digitally encoded message to perform operations based upon the speech processing result data.

13. The method of claim 12, wherein the JAVA SCRIPT is written in AJAX.

14. The method of claim 12, wherein the JAVA SCRIPT is contained in a Web 2.0 widget.

15. The method of claim 12, further comprising:
communicating with the voice browser using asynchronous Hyper Text Transfer Protocol (HTTP) based messages.

16. The method of claim 12, wherein the voice browser utilizes a set of RESTful commands, which comprise a Hypertext Transfer Protocol (HTTP) GET command, an HTTP POST command, an HTTP PUT command, and an HTTP DELETE command, wherein each of the RESTful commands is a command in conformance with Representational State Transfer (REST) principles.

17. The method of claim 12, wherein the Web 2.0 content is part of a speech-enabled application, wherein the speech-enabled application comprises an introspection document, a collection of entries, and a collection of resources each of which conforms to the Atom Publishing Protocol (APP) based protocol.

18. The method of claim 17, wherein speech resources of the speech-enabled application are dynamically discoverable through introspection, and wherein the voice browser is capable of configuring the speech resources of the speech-enabled application.

19. The method of claim 17, wherein use of introspection permits state of the speech-enabled application to be dynamically determined at runtime.

20. The method of claim 12, further comprising:
executing the JAVA SCRIPT code to establish an interface between a Web browser and at least one remotely located speech processing engine;
performing the establishing and receiving steps for the Web browser; and
the Web browser processing the digitally encoded message to perform operations based upon the speech processing result data, whereby the Web browser is able to interface to components of a Web 2.0 environment in substantially the same manner as the voice browser.

* * * * *